(12) United States Patent
Mitchell et al.

(10) Patent No.: US 11,507,862 B2
(45) Date of Patent: Nov. 22, 2022

(54) DETERMINING SKILL ADJACENCIES USING A MACHINE LEARNING MODEL

(71) Applicant: International Business Machines Corporation, Armonk, NY (US)

(72) Inventors: Stephen Mitchell, Chapel Hill, NC (US); David Glenn George, Cary, NC (US); Matthew Morehouse, Lincoln, NE (US); John Arthur Medicke, Raleigh, NC (US); Scott Gerard, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 16/846,375

(22) Filed: Apr. 12, 2020

(65) Prior Publication Data

US 2021/0319334 A1 Oct. 14, 2021

(51) Int. Cl.
*G06N 5/04* (2006.01)
*G06N 20/00* (2019.01)
*G06Q 10/10* (2012.01)

(52) U.S. Cl.
CPC ............... *G06N 5/04* (2013.01); *G06N 20/00* (2019.01); *G06Q 10/1053* (2013.01)

(58) Field of Classification Search
CPC ........... G06Q 10/00–50/00; G06N 3/00–20/00
USPC ................. 706/1–45, 62, 900–902
See application file for complete search history.

(56) References Cited

U.S. PATENT DOCUMENTS

| | | | |
|---|---|---|---|
| 9,436,760 B1* | 9/2016 | Tacchi | G06F 16/9024 |
| 9,697,472 B2 | 7/2017 | Burgess | |
| 9,773,043 B2* | 9/2017 | Polonsky | G06Q 30/0269 |
| 10,354,017 B2 | 7/2019 | Skomoroch | |
| 10,380,552 B2 | 8/2019 | Zhang | |
| 10,380,701 B2* | 8/2019 | Lin | G06Q 50/01 |
| 2007/0078845 A1* | 4/2007 | Scott | G06Q 30/02 707/999.005 |
| 2008/0086366 A1 | 4/2008 | Concordia | |
| 2012/0232944 A1 | 9/2012 | Zhu | |
| 2013/0218620 A1 | 8/2013 | Liu | |

(Continued)

OTHER PUBLICATIONS https://web.archive.org/web/20190510113751/https://en.wikipedia.org/wiki/Word2vec (Year: 2019).*

(Continued)

*Primary Examiner* — Alan S Miller
(74) *Attorney, Agent, or Firm* — Edward P. Li

(57) ABSTRACT

A computer-implemented method, a computer program product, and a computer system for determining skill adjacencies using a machine learning model. A computer calculates first similarity scores between first skill vectors obtained from one or more training datasets and second similarity scores between the first skill vectors and skill category vectors pre-calculated from job requisitions, using both a reference corpus word embedding model and a target corpus word embedding model. The computer generates features extracted from the first similarity scores and the second similarity scores. Based on the features, the computer trains a machine learning model for classifying combinations of skills as adjacent and non-adjacent. The machine learning model is used to determine skill adjacencies between skills extracted from the job requisitions and skills extracted from resumes.

18 Claims, 8 Drawing Sheets

(56) References Cited

U.S. PATENT DOCUMENTS

| | | | |
|---|---|---|---|
| 2016/0034852 A1 | 2/2016 | Kapur | |
| 2017/0371933 A1* | 12/2017 | Polonsky | H04L 67/306 |
| 2018/0032606 A1* | 2/2018 | Tolman | G06F 16/951 |
| 2018/0137090 A1* | 5/2018 | Duan | G06F 40/30 |
| 2018/0189739 A1* | 7/2018 | Kenthapadi | G06F 16/9535 |
| 2018/0232700 A1* | 8/2018 | Li | G06N 5/04 |
| 2018/0268373 A1 | 9/2018 | Bheemavarapu | |
| 2018/0332135 A1 | 11/2018 | Jayaram | |
| 2019/0122161 A1 | 4/2019 | Cicio, Jr. | |
| 2019/0188742 A1* | 6/2019 | Vasudevan | G06Q 30/0204 |
| 2019/0236718 A1 | 8/2019 | Rastkar | |
| 2019/0384817 A1* | 12/2019 | Jo | G06F 40/216 |
| 2020/0302368 A1* | 9/2020 | Mathiesen | G06N 5/041 |
| 2020/0311683 A1* | 10/2020 | Chua | G06Q 10/1053 |
| 2021/0004442 A1* | 1/2021 | Sapugay | G06F 40/253 |
| 2021/0011961 A1* | 1/2021 | Guan | G06F 3/04842 |
| 2021/0065126 A1* | 3/2021 | Bykov | G06Q 10/1053 |

OTHER PUBLICATIONS

"IBM Watson Recruitment Administrator's Guide", IBM Watson Recruitment User's Manual, May 2019, 138 pages, Evidence of Grace Period Use or Sale.

Maurya, Abhinav, "Understanding Job-Skill Relationships using Big Data and Neural Networks", Bloomberg Data for Good Exchange Conference, Sep. 16, 2018, 6 pages.

Mell et al., "The NIST Definition of Cloud Computing", National Institute of Standards and Technology, Special Publication 800-145, Sep. 2011, 7 pages.

Van-Duyet, et al., "Skill2vec: Machine Learning Approach for Determining the Relevant Skills from Job Description", arXiv:1707.09751v2 [cs.CL] Mar. 29, 2018, 3 pages.

Vasudevan, et al., "Estimating Fungibility Between Skills by Combining Skill Similarities Obtained from Multiple Data Sources", Data Science and Engineering (2018) 3:248-262, <https://doi.org/10.1007/s41019-018-0075-3>.

Xu, et al., "Measuring the Popularity of Job Skills in Recruitment Market: A Multi-Criteria Approach", The Thirty-Second AAAI Conference on Artificial Intelligence (AAAI-18), pp. 2572-2579.

Zhao, et al., "Skill: A System for Skill Identification and Normalization", Proceedings of the Twenty-Seventh Conference on Innovative Applications of Artificial Intelligence, 2015, pp. 4012-4017.

* cited by examiner

DETERMINING SKILL ADJACENCIES USING A MACHINE LEARNING MODEL

The following disclosure is submitted under 35 U.S.C. 102(b)(1)(A): DISCLOSURE: "IBM Watson Recruitment Administrator's Guide", IBM Watson Recruitment User's Manual, May 2019, 138 pages, Evidence of Grace Period Use or Sale.

BACKGROUND

The present invention relates generally to determining skill adjacencies, and more particularly to determining skill adjacencies using a machine learning model.

When a human resources professional is hiring employees for a job that requires highly specialized skills, hundreds of applicants are expected. To sort through these applications, the human resources professional may use software that can parse resumes and extract keywords and phrases.

SUMMARY

In one aspect, a computer-implemented method for determining skill adjacencies using a machine learning model is provided. The computer-implemented method includes calculating first similarity scores between first skill vectors obtained from one or more training datasets and second similarity scores between the first skill vectors and skill category vectors pre-calculated from job requisitions, using both a reference corpus word embedding model and a target corpus word embedding model. The computer-implemented method further includes generating features extracted from the first similarity scores and the second similarity scores. The computer-implemented method further includes training a machine learning model for classifying combinations of skills as adjacent and non-adjacent, based on the features. In the computer-implemented method the machine learning model is used to determine skill adjacencies between skills extracted from the job requisitions and skills extracted from resumes.

In another aspect, a computer program product for determining skill adjacencies using a machine learning model is provided. The computer program product comprises a computer readable storage medium having program instructions embodied therewith, and the program instructions are executable by one or more processors. The program instructions are executable to calculate, by a computer, first similarity scores between first skill vectors obtained from one or more training datasets and second similarity scores between the first skill vectors and skill category vectors pre-calculated from job requisitions, using both a reference corpus word embedding model and a target corpus word embedding model; executable to generate, by the computer, features extracted from the first similarity scores and the second similarity scores; and executable to train, by the computer, a machine learning model for classifying combinations of skills as adjacent and non-adjacent, based on the features. In the computer program product, the machine learning model is used to determine skill adjacencies between skills extracted from the job requisitions and skills extracted from resumes.

In yet another aspect, a computer system for determining skill adjacencies using a machine learning model is provided. The computer system comprises one or more processors, one or more computer readable tangible storage devices, and program instructions stored on at least one of the one or more computer readable tangible storage devices for execution by at least one of the one or more processors. The program instructions are executable to calculate, by a computer, first similarity scores between first skill vectors obtained from one or more training datasets and second similarity scores between the first skill vectors and skill category vectors pre-calculated from job requisitions, using both a reference corpus word embedding model and a target corpus word embedding model. The program instructions are further executable to generate, by the computer, features extracted from the first similarity scores and the second similarity scores. The program instructions are further executable to train, by the computer, a machine learning model for classifying combinations of skills as adjacent and non-adjacent, based on the features. In the computer system, the machine learning model is used to determine skill adjacencies between skills extracted from the job requisitions and skills extracted from resumes.

DETAILED DESCRIPTION

While a human resources professional has a skills taxonomy that can be used to classify extracted keywords and phrases into, new skills and technologies are constantly appearing on the marketplace, and there is no way for the human resources professional to keep up with thousands of new skills and to classify them appropriately. Furthermore, there exists considerable variability in the terminology for skills that the human resources professional already has in a pre-established skills dictionary. Thus, the human resources professional's ability to identify skills on a resume is limited, and there is a risk that the human resources professional's identification of suitable job candidates will be highly biased toward candidates whose resumes contain terms that are already in the pre-established skills dictionary, which may not be reflective of the most up-to-date skill sets.

Consequently, the human resource professional's ability to determine the match for skills on applicants' resumes is limited and at risk of being unfairly biased caused by subconscious bias in human minds.

Embodiments of the present invention provide solutions to above-mentioned problems. Embodiments of the present invention develops and trains a machine learning model to deliver a state-of-the art talent acquisition experience. A human resources professional can use the cognitive power of the machine learning model developed and trained in the present invention to prioritize requisitions, match skills of candidates to requisition requirements, and identify applicants using skill adjacencies.

Figure 1:
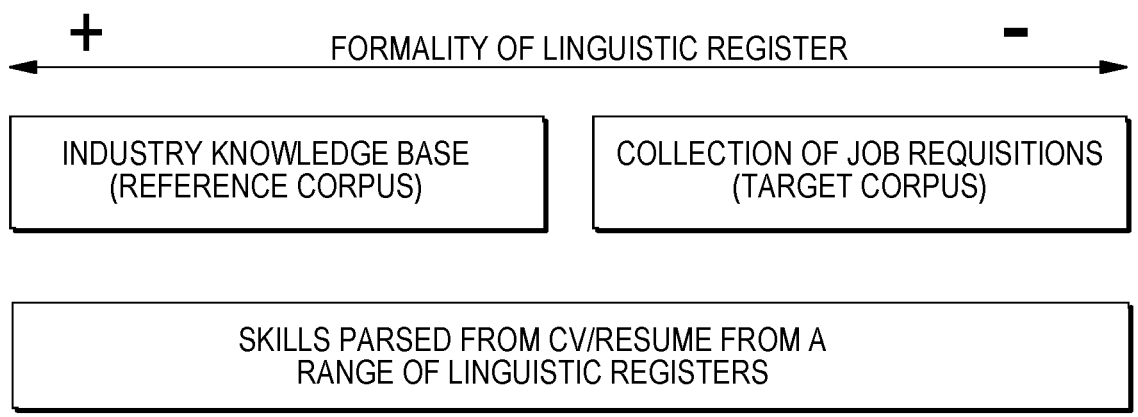
FIG. 1 shows an illustration of contrasting linguistic registers used in describing job skills, in accordance with one embodiment of the present invention.

Embodiments of the present invention present a system for classifying previously unidentified skills (or skills with multiple nomenclatures) for purposes of job applicant scoring. Job adjacencies between skills are ascertained through the use of two word embedding models and a skills taxonomy. The word embedding models quantifies relationships between words or phrases, based on the number of times that the words or phrases are found to occur nearby (e.g., within ±5 words of each other) in the same body of text. The first word embedding model is built from an industry knowledge base corpus (which serves as a reference corpus) describing jobs and job skills. The second word embedding model is built from a corpus (which serves as a target corpus) including a collection of job requisitions; the target corpus is an implementation of how topics used in the reference corpus are used in a relevant context (specifically, it is used for the purpose of attracting candidates to jobs). The use of the two corpuses is based on fact that resumes/CVs are often a blend of language registers (degrees of formality) found in a reference corpus and language registers found in a target corpus. FIG. 1 shows an illustration of the formality of the linguistic registers of the two corpus (the reference corpus and the target corpus) and skills parsed from resumes/CVs from a range of linguistic registers. The use of the two word embedding models (a reference corpus word embedding model and a target corpus word embedding model) in determining adjacency works to ensure that the treatment of skills accounts for the variety of contexts in which skills are described.

Figure 2:
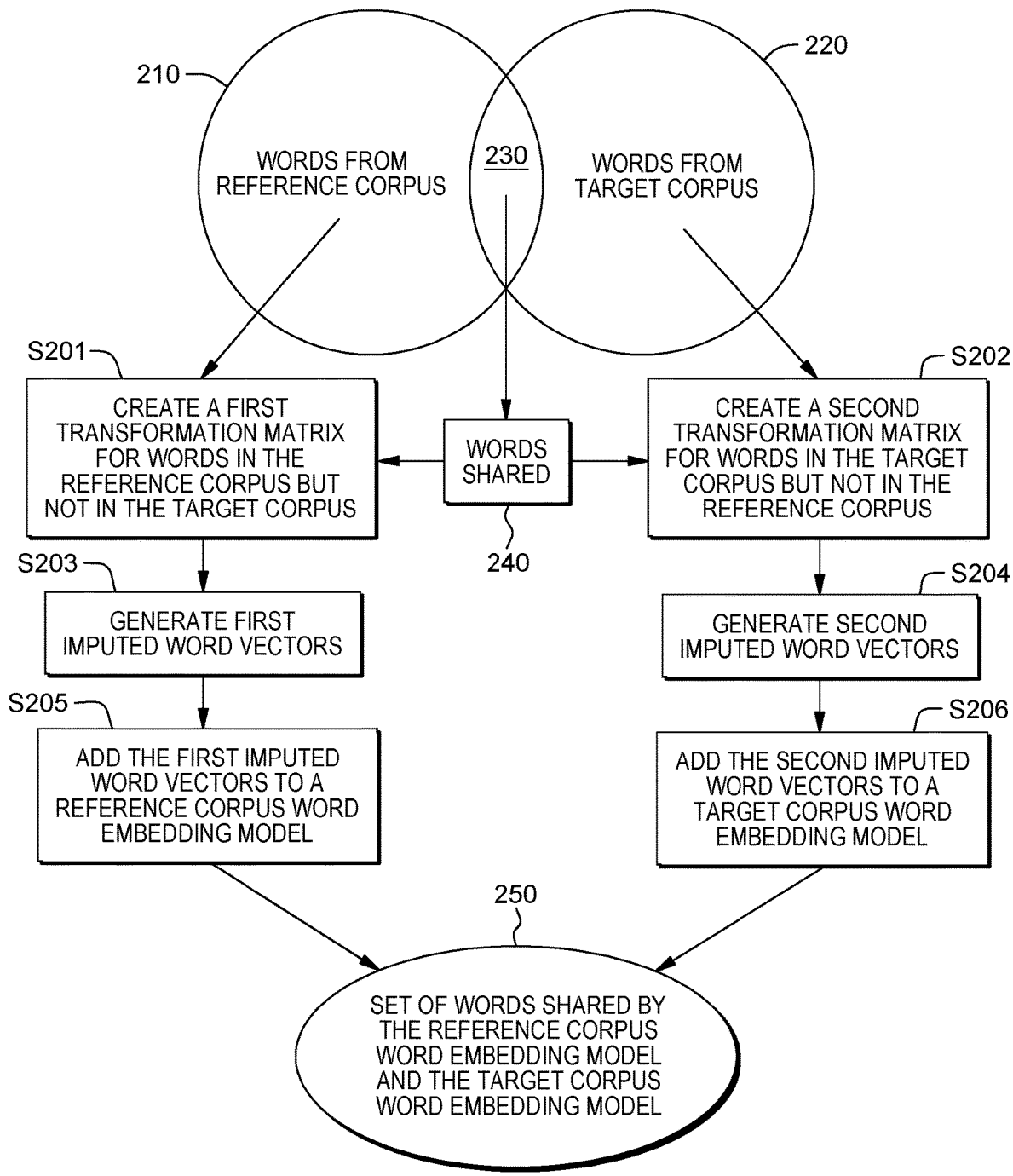
FIG. 2 presents a flowchart showing operational steps of imputing word vectors between a reference corpus and a target corpus, in accordance with one embodiment of the present invention.

FIG. 2 presents a flowchart showing operational steps of imputing word vectors between a reference corpus and a target corpus, in accordance with one embodiment of the present invention. Using two word embedding models (a reference corpus word embedding model and a reference corpus word embedding model) necessitates that a set of words in their respective vocabularies be identical. The two word embedding models are derived from different corpuses of text. While the two word embedding models undoubtedly share many of the same words, there will nevertheless be many words found in one corpus but not the other. To fill in the missing word vectors of each of the two word embedding models, an approach disclosed in the present invention looks for an intersection of words found in a reference corpus and a target corpus. FIG. 2 shows words from the reference corpus 210, words from the target corpus 210, and the intersection 230. Words shared 240 by both of these sources are used to generate two distinct transformation matrices.

The operational steps of imputing word vectors between a reference corpus and a target corpus are implemented by a computer or server. The computer or server is described in more detail in later paragraphs with reference to FIG. 6. In another embodiment, the operational steps may be implemented in a cloud computing environment. The cloud computing environment is described in later paragraphs with reference to FIG. 7 and FIG. 8.

At step S201, the computer creates a first transformation matrix for words in the reference corpus but not in the target corpus, by calculating a dot product of a transposed reference corpus matrix and a Moore-Penrose pseudoinverse matrix from the transposed target corpus matrix. At step S202, the computer creates a second transformation matrix for words in the target corpus but not in the reference corpus, by calculating a dot product of a transposed target corpus matrix and a Moore-Penrose pseudoinverse matrix from the transposed reference corpus matrix.

To make a transformation matrix for matrix T (T for the target corpus) in which word vectors from matrix R (R for the reference corpus) are imputed, a matrix of words shared between matrix T and matrix R is made. Once the matrix of shared words and their associated vectors are created, a matrix transpose of the matrix that word vectors are imputed from matrix R is performed to give the transformed matrix R'. Then, R' is used to estimate a Moore-Penrose pseudo-inverse of matrix R', giving (R')$^+$. Next, a matrix transpose of the matrix that word vectors are being imputed to (T) is performed to give the transformed matrix T'. Then, a transformation matrix $M_{TR}$ is calculated as a matrix product between the transformed matrix T' and matrix (R')$^+$, by the following equation:

$$M_{TR} = T' \cdot (R')^+$$

Using the same method outlined above for calculating $M_{TR}$, a transformation matrix $M_{RT}$ is calculated as a matrix product between the transformed matrix R' and matrix (T')$^+$, by the following equation:

$$M_{RT} = R' \cdot (T')^+$$

The transformation matrix $M_{TR}$ is used to impute vectors for words found in the reference corpus but not the target corpus, by having the respective vectors multiplied by the transformation matrix $M_{TR}$ to get word vectors for the target corpus. The transformation matrix $M_{RT}$ is used to impute vectors for words found in the target corpus but not the reference corpus, by having the respective vectors multiplied by the transformation matrix $M_{RT}$ to get word vectors for the reference corpus.

Following step S201, the computer generates at step S203 first imputed word vectors by calculating a dot product between the first transformation matrix and each word vector for all words in the reference corpus but not in the target corpus. Following step S203, the computer generates at step S205 adds the first imputed word vectors to a reference corpus word embedding model.

Following step S202, the computer generates at step S204 first imputed word vectors, by calculating a dot product between the second transformation matrix and each word vector for all words in the target corpus but not in the reference corpus. Following step S204, the computer generates at step S206 adds the second imputed word vectors to a target corpus word embedding model.

Once the first imputed word vectors are added to a reference corpus word embedding model and the second imputed word vectors are added to a target corpus word embedding model, a set 250 of words shared by the reference corpus word embedding model and the target corpus word embedding model is created.

Figure 3:
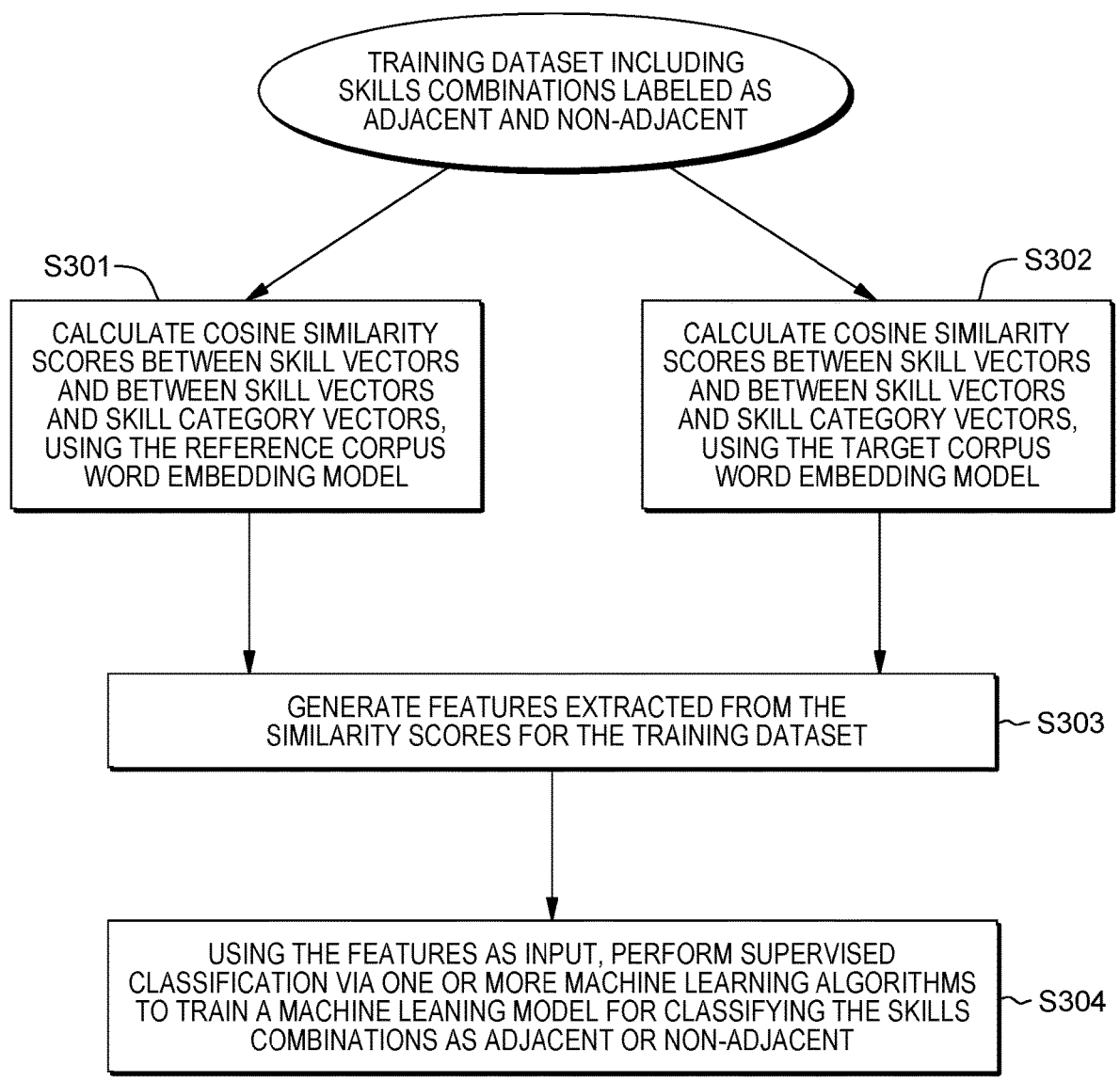
FIG. 3 presents a flowchart showing operational steps of training a machine leaning model for classifying skills combinations as adjacent or non-adjacent, in accordance with one embodiment of the present invention.

FIG. 3 presents a flowchart showing operational steps of training a machine leaning model for classifying skills combinations as adjacent or non-adjacent, in accordance with one embodiment of the present invention. In training the machine leaning model, one or more training datasets including skills combinations labeled as adjacent and non-adjacent are used.

The operational steps of training a machine leaning model for classifying the skills combinations as adjacent or non-adjacent are implemented by a computer or server. The computer or server is described in more detail in later paragraphs with reference to FIG. 6. In another embodiment, the operational steps may be implemented in a cloud computing environment. The cloud computing environment is described in later paragraphs with reference to FIG. 7 and FIG. 8.

At step S301, the computer calculates similarity scores between skill vectors and similarity scores between skill vectors and skill category vectors, using the reference corpus word embedding model. At step S302, the computer calculates similarity scores between skill vectors and similarity scores between skill vectors and skill category vectors, using the target corpus word embedding model. In one embodiment of the present invention, cosine similarity scores between skill vectors and cosine similarity scores between skill vectors and skill category vectors are calculated. Cosine similarity is a measure of similarity between two non-zero vectors of an inner product space that measures the cosine of the angle between them.

The cosine similarity scores between respective ones of skill vectors are calculated using both word embedding models (i.e., the reference corpus word embedding model and the target corpus word embedding model). If a cosine similarity score between two skill vectors is less than a skill similarity clip level (SS), the two skill vectors are deemed to be adjacent.

Additionally, the cosine similarity scores between respective ones of skill vectors and respective ones of skill category vectors are calculated. If a cosine similarity score between a skill vector and a skill category vector is less than a skill category similarity clip level (SC), the skill vector and the skill category vector are deemed to be adjacent. A skill category vector is pre-calculated by averaging from a set of words contained in each article in the reference corpus. Also, a skill category vector is pre-calculated by averaging from a set of words contained in each category of jobs from a database of job requisition text in the target corpus.

At step S303, the computer generates features extracted from the similarity scores calculated at steps S301 and S302. The generated features include cosine similarity scores between pairs of skills using the two models (i.e., the reference corpus word embedding model and the target corpus word embedding model). The generated features further include Boolean variables for whether there are any shared category vectors occurring in top-n category vectors (based on cosine similarity scores between skill vectors and category vectors). The generated features further include the number of shared top-n category vectors. The generated features further include cosine similarity scores of top-n category vectors.

At step S304, using the features as input, the computer performs supervised classification via one or more machine learning algorithms to train a machine leaning model for classifying the skills combinations as adjacent or non-adjacent.

The features are used to perform a supervised classification via one or more machine learning algorithms (such as Random Forest, Naïve Bayes, and Stochastic Gradient Descent) on the one or more training datasets of skills labeled as adjacent or non-adjacent. The importance each of the features in assigning a correct classification will be accounted for and incorporated into the machine learning algorithm training process.

The machine learning model, which is developed and trained in the above-mentioned operational steps, is above and beyond capabilities of human minds of human resources professionals in identifying thousands of new skills and classifying the new skills appropriately. The machine learning model is not limited by human minds but eliminates human's subconscious bias of human minds in identifying skills and candidates of job requisitions.

Figure 4:
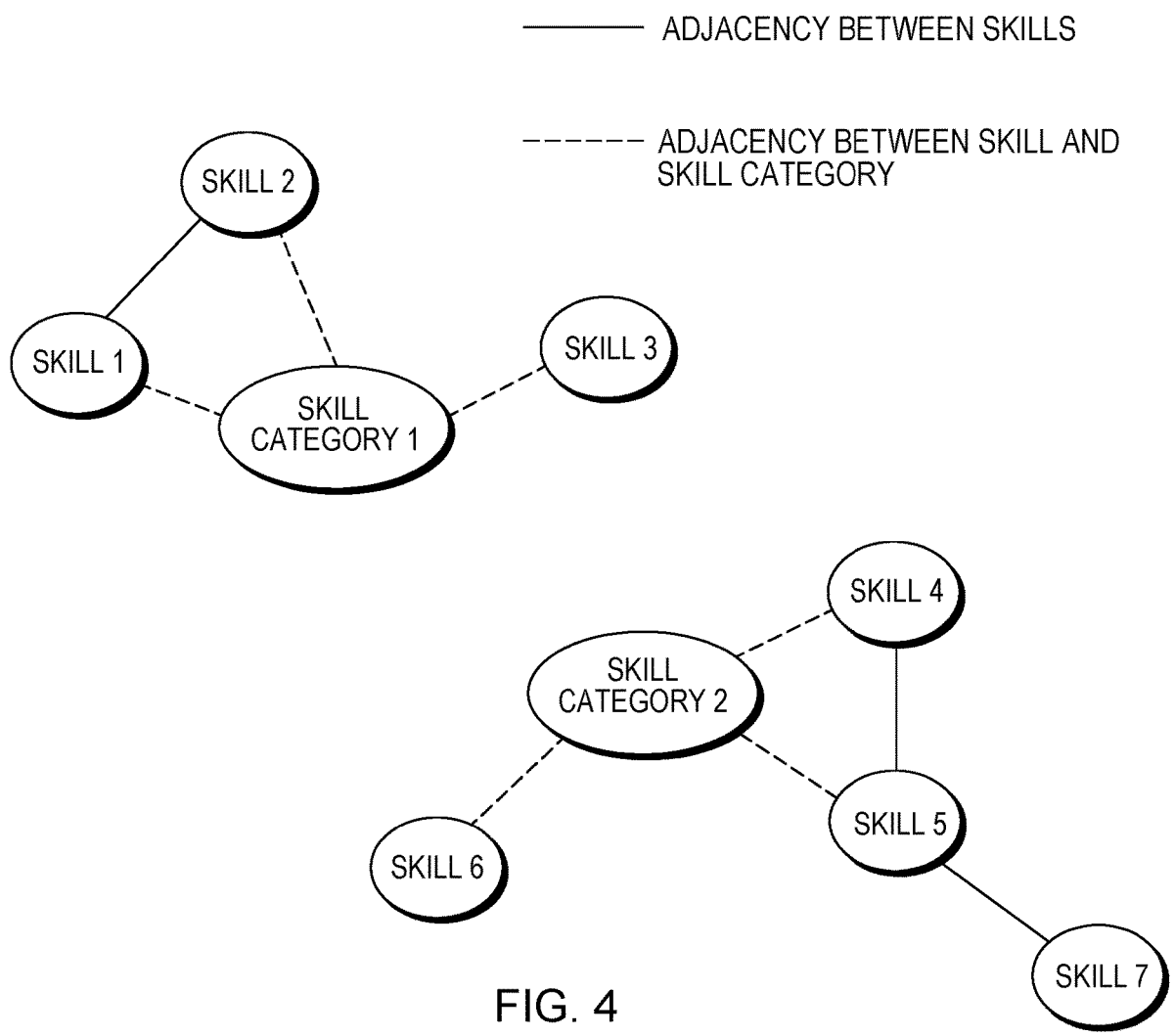
FIG. 4 shows an illustration of a skill to skill match with a similarity score less than a skill similarity clip level and a skill to skill category match with a similarity score less than a skill category similarity clip level, in accordance with one embodiment of the present invention.

FIG. 4 shows an illustration of a skill to skill match with a similarity score less than a skill similarity clip level and a skill to skill category match with a similarity score less than a skill category similarity clip level, in accordance with one embodiment of the present invention. The example illustrated in FIG. 4 includes skill 1, skill 2, skill 3, . . . , and skill 7, and the example also includes skill category 1 and skill category 2. FIG. 4 shows that the adjacency between skill 1 and skill 2, the adjacency between skill 4 and skill 5, and the adjacency between skill 5 and skill 7. The adjacency scores of these pairs of skills are less than the skill category similarity clip level.

FIG. 4 also shows the adjacency between skill 1 and skill category 1, the adjacency between skill 2 and skill category 1, and the adjacency between skill 3 and skill category 1. The adjacency scores between the skills and skill category 1 are less than the skill category similarity clip level. Skill category 1 is a category shared by skill 1, skill 2, and skill 3.

FIG. 4 also shows the adjacency between skill 4 and skill category 2, the adjacency between skill 5 and skill category 2, and the adjacency between skill 6 and skill category 2. The adjacency scores between the skills and skill category 2 are less than the skill category similarity clip level. Skill category 2 is a category shared by skill 4, skill 5, and skill 6.

Figure 5:
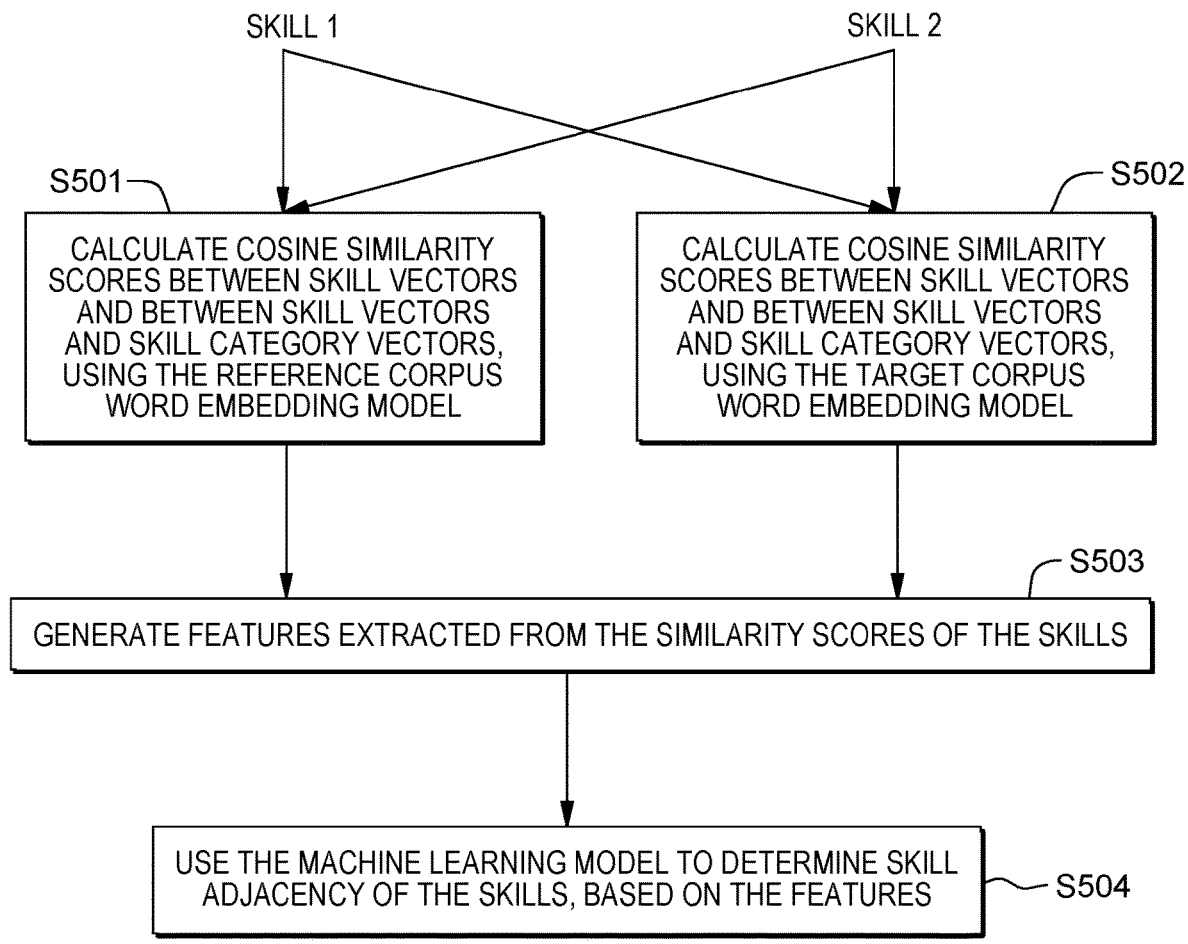
FIG. 5 presents a flowchart showing operational steps of using a machine learning model to determine a skill adjacency of two skills, in accordance with one embodiment of the present invention.

FIG. 5 presents a flowchart showing operational steps of using a machine learning model to determine a skill adjacency of two skills, in accordance with one embodiment of the present invention. The operational steps of using a machine learning model to determine the skill adjacency of the two skills are implemented by a computer or server. The computer or server is described in more detail in later paragraphs with reference to FIG. 6. In another embodiment, the operational steps may be implemented in a cloud computing environment. The cloud computing environment is described in later paragraphs with reference to FIG. 7 and FIG. 8.

In the present invention, a text parser is used to extract skills from job requisitions published in job boards and extract skills from resumes of candidates applying to the jobs. In FIG. 5, for example, skill 1 is extracted from the job requisitions and skill 2 is extracted from the resumes. Once two sources (job requisitions and resumes) are parsed, skills (e.g., skill 1 and skill 2 in FIG. 5) from the both sources are output into two lists and a skills adjacency function scores the two lists of skills. Each single word skill has a numerical vector that can be used to quantify a relationship with other words, through a matrix product calculation (calculation of cosine similarity). Each multi-word phrase is quantified by averaging vectors for all words in the phrase (excluding stop words); a numerical vector generated by averaging the vectors can be used to quantify a relationship with other words (or averaged word vectors of other multi-word phrases). The quantification the relationships is given by similarity scores, for example, cosine similarity scores.

At step S501, the computer calculates cosine similarity scores between skill vectors and cosine similarity scores between skill vectors and skill category vectors, using the reference corpus word embedding model. At step S502, the computer calculates cosine similarity scores between skill vectors and cosine similarity scores between skill vectors and skill category vectors, using the target corpus word embedding model.

At step S503, the computer generates features extracted from the similarity scores calculated at steps S501 and S502. The generated features include cosine similarity scores between pairs of skills determined by using the reference corpus word embedding model and the target corpus word embedding model, Boolean variables for whether there are any shared category vectors occurring in top-n category vectors (which is determined based on cosine similarity scores between skill vectors and category vectors), the number of shared top-n category vectors, and cosine similarity scores of top-n category vectors.

At step S504, the computer uses the machine learning model to determine skill adjacency of the skills (e.g., skill 1 and skill 2 in FIG. 5), based on features generated at step S503. The machine learning model has been trained with one or more training datasets including skills combinations labeled as adjacent and non-adjacent. The operation steps of training the machine leaning model are described in previous paragraphs with respect to FIG. 3.

By determining skill adjacencies of the skills using the machine learning model, the computer-implemented approach helps a human resources professional match skills of candidates to requisition requirements and identify applicants. The computer-implemented approach overcomes problems of limited abilities of human recourses professionals in identifying thousands of new skills and classifying the new skills appropriately. Furthermore, the computer-implemented approach eliminates human's subconscious bias in human minds.

Figure 6:
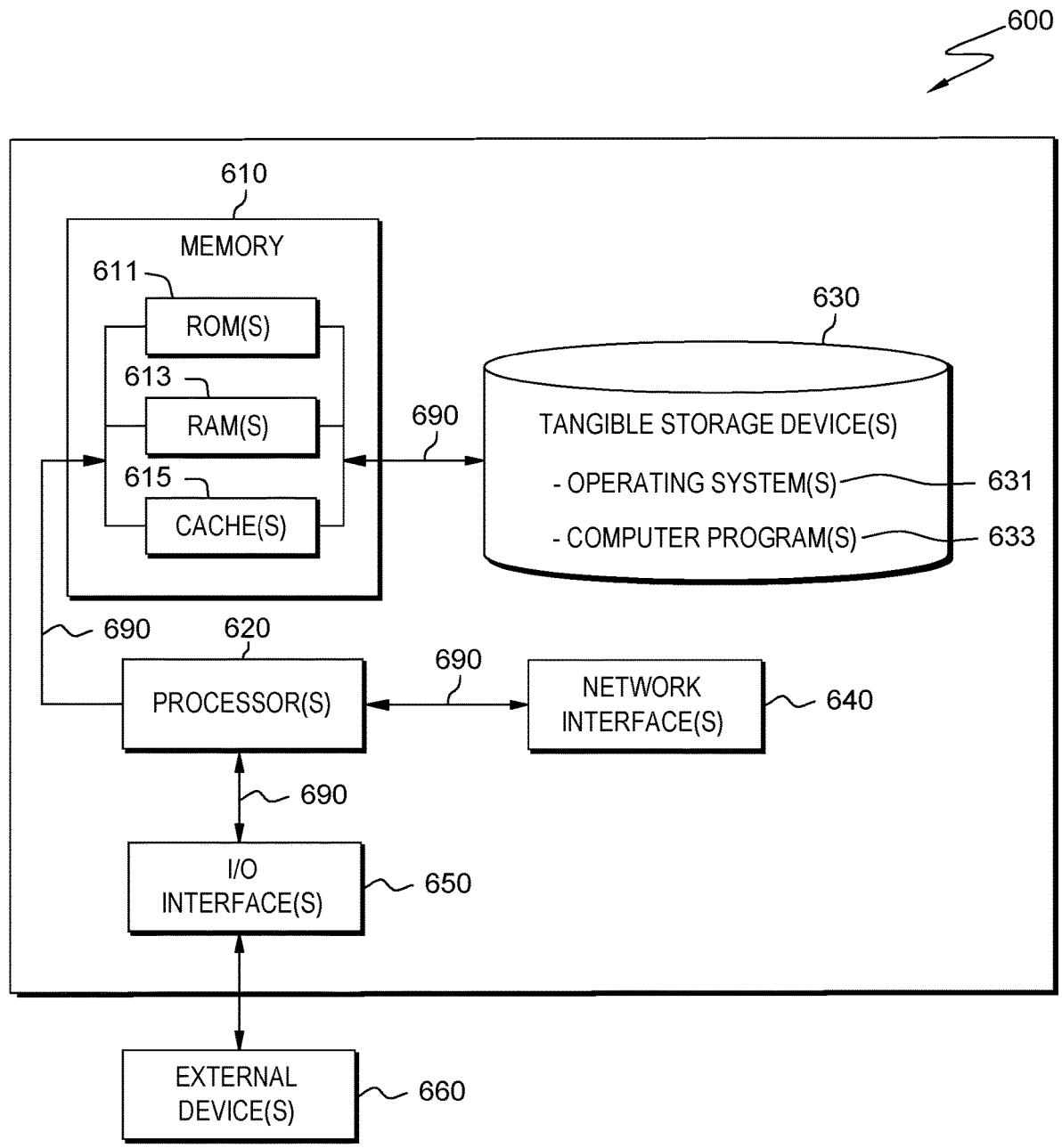
FIG. 6 is a diagram illustrating components of a computer or server, in accordance with one embodiment of the present invention.

FIG. 6 is a diagram illustrating components of computer device 600, in accordance with one embodiment of the present invention. It should be appreciated that FIG. 6 provides only an illustration of one implementation and does not imply any limitations with regard to the environment in which different embodiments may be implemented.

Referring to FIG. 6, computing device 600 includes processor(s) 620, memory 610, and tangible storage device(s) 630. In FIG. 6, communications among the above-mentioned components of computing device 600 are denoted by numeral 690. Memory 610 includes ROM(s) (Read Only Memory) 611, RAM(s) (Random Access Memory) 613, and cache(s) 615. One or more operating systems 631 and one or more computer programs 633 reside on one or more computer readable tangible storage device(s) 630.

Computing device 600 further includes I/O interface(s) 650. I/O interface(s) 650 allows for input and output of data with external device(s) 660 that may be connected to computing device 600. Computing device 600 further includes network interface(s) 640 for communications between computing device 600 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
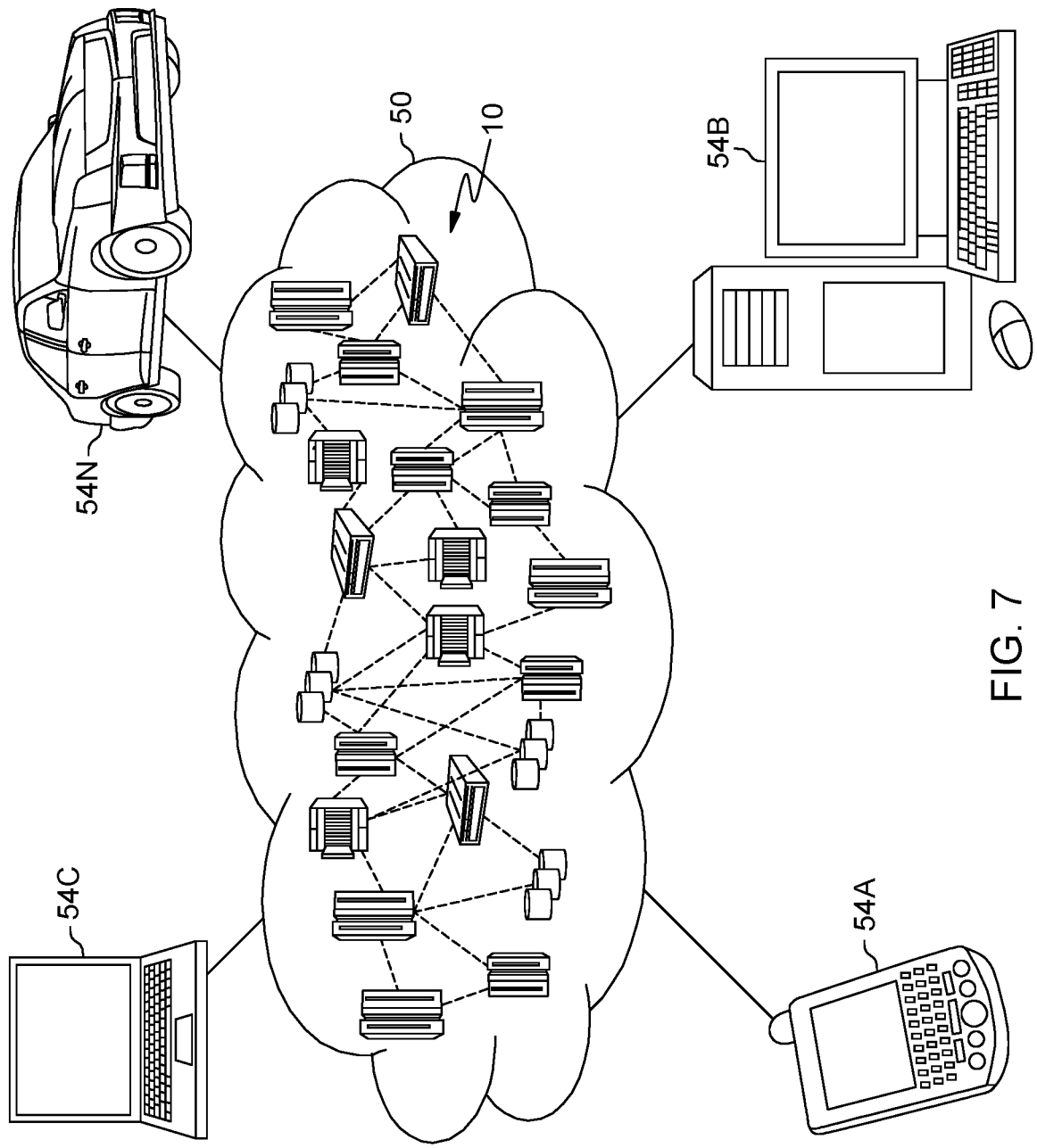
FIG. 7 depicts a cloud computing environment, in accordance with one embodiment of the present invention.

Referring now to FIG. 7, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 8:
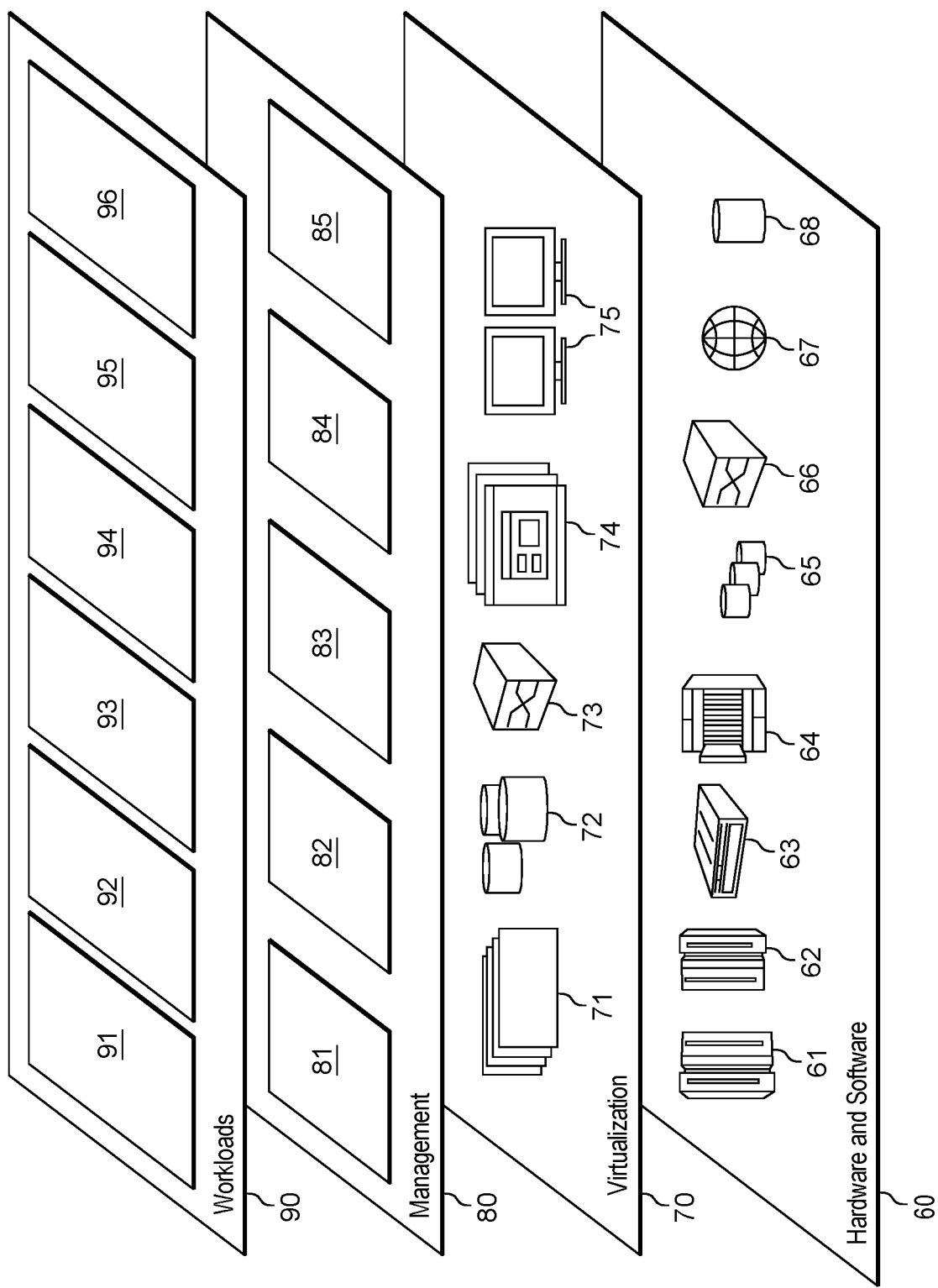
FIG. 8 depicts abstraction model layers in a cloud computing environment, in accordance with one embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in in the cloud computing environment is the functionality of training a machine leaning model for classifying the skills combinations as adjacent or non-adjacent and/or the functionality of using a machine learning model to determine skill adjacency of the skills.

What is claimed is:

1. A computer-implemented method for training a machine learning model used for determining skill adjacencies, the method comprising:

generating, by a computer, first imputed word vectors from a first matrix for words in an industry knowledge base but not in a collection of job requisitions;

adding, by the computer, the first imputed word vectors to a reference corpus word embedding model;

generating, by the computer, second imputed word vectors from a second matrix for words in the collection of the job requisitions but not in the industry knowledge base;

adding, by the computer, the second imputed word vectors to a target corpus word embedding model;

calculating, by the computer, first similarity scores between first skill vectors obtained from one or more training datasets and second similarity scores between the first skill vectors and skill category vectors pre-calculated from the job requisitions, using both the reference corpus word embedding model and the target corpus word embedding model;

generating, by the computer, features extracted from the first similarity scores and the second similarity scores;

training, by the computer, a machine learning model for classifying combinations of skills as adjacent and non-adjacent, using the features as input; and wherein the machine learning model is used to determine skill adjacencies between skills extracted from the job requisitions and skills extracted from resumes.

2. The computer-implemented method of claim 1, for using the machine learning model to determine skill adjacencies, further comprising:

calculating, by the computer, third similarity scores between second skill vectors for the skills extracted from the job requisitions and third skill vectors for the skills extracted from the resumes, calculating fourth similarity scores which include similarity scores between the second skill vectors and the skill category vectors and include similarity scores between the third skill vectors and the skill category vectors, using both the reference corpus word embedding model and the target corpus word embedding model;

generating, by the computer, features extracted from the third similarity scores and the fourth similarity scores;

determining, by the computer, the skill adjacencies between the skills extracted from the job requisitions and the skills extracted from resumes, by using the machine learning model, based on the features extracted from the third similarity scores and the fourth similarity scores; and wherein the features extracted from the third similarity scores and the fourth similarity scores include at least one of: the third similarity scores and the fourth similarity scores, Boolean variables for whether there are any shared skill category vectors occurring in top skill category vectors, a number of shared top skill category vectors, and similarity scores of the top skill category vectors.

3. The computer-implemented method of claim 2, further comprising:

determining, by the computer, whether a similarity score between a respective one of the second skill vectors and a respective one of the third skill vectors is less than a first predetermined threshold; and in response to determining that the similarity score is less than the first predetermined threshold, identifying, by the computer, the respective one of the second skill vectors and the respective one of the third skill vectors as adjacent.

4. The computer-implemented method of claim 2, further comprising:

determining, by the computer, whether a similarity score between a respective one of the third skill vectors and a respective one of the skill category vectors is less than a second predetermined threshold; and in response to determining that the similarity score is less than the second predetermined threshold, identifying, by the computer, the respective one of the third skill vectors and the respective one of the skill category vectors as adjacent.

5. The computer-implemented method of claim 1, wherein the features extracted from the first similarity scores and the second similarity scores include at least one of: the first similarity scores and the second similarity scores, Boolean variables for whether there are any shared skill category vectors occurring in top skill category vectors, a number of shared top skill category vectors, and similarity scores of the top skill category vectors.

6. The computer-implemented method of claim 1, wherein the industry knowledge base serves as a reference corpus and the collection of the job requisitions serves as a target corpus.

7. A computer program product for training a machine learning model used for determining skill adjacencies, the computer program product comprising a computer readable storage medium having program instructions embodied therewith, the program instructions executable by one or more processors, the program instructions executable to:

generate, by a computer, first imputed word vectors from a first matrix for words in an industry knowledge base but not in a collection of job requisitions;

add, by the computer, the first imputed word vectors to a reference corpus word embedding model;

generate, by the computer, second imputed word vectors from a second matrix for words in the collection of the job requisitions but not in the industry knowledge base;

add, by the computer, the second imputed word vectors to a target corpus word embedding model;

calculate, by the computer, first similarity scores between first skill vectors obtained from one or more training datasets and second similarity scores between the first skill vectors and skill category vectors pre-calculated from the job requisitions, using both the reference corpus word embedding model and the target corpus word embedding model;

generate, by the computer, features extracted from the first similarity scores and the second similarity scores;

train, by the computer, a machine learning model for classifying combinations of skills as adjacent and non-adjacent, using the features as input; and wherein the machine learning model is used to determine skill adjacencies between skills extracted from the job requisitions and skills extracted from resumes.

8. The computer program product of claim 7, for using the machine learning model to determine skill adjacencies, further comprising the program instructions executable to:

calculate, by the computer, third similarity scores between second skill vectors for the skills extracted from the job requisitions and third skill vectors for the skills extracted from the resumes, calculate fourth similarity scores which include similarity scores between the second skill vectors and the skill category vectors and include similarity scores between the third skill vectors and the skill category vectors, using both the reference corpus word embedding model and the target corpus word embedding model;

generate, by the computer, features extracted from the third similarity scores and the fourth similarity scores;

determine, by the computer, the skill adjacencies between the skills extracted from the job requisitions and the skills extracted from resumes, by using the machine learning model, based on the features extracted from the third similarity scores and the fourth similarity scores; and wherein the features extracted from the third similarity scores and the fourth similarity scores include at least one of: the third similarity scores and the fourth similarity scores, Boolean variables for whether there are any shared skill category vectors occurring in top skill category vectors, a number of shared top skill category vectors, and similarity scores of the top skill category vectors.

9. The computer program product of claim 8, further comprising the program instructions executable to:

determine, by the computer, whether a similarity score between a respective one of the second skill vectors and a respective one of the third skill vectors is less than a first predetermined threshold; and in response to determining that the similarity score is less than the first predetermined threshold, identify, by the computer, the respective one of the second skill vectors and the respective one of the third skill vectors as adjacent.

10. The computer program product of claim 8, further comprising the program instructions executable to:

determine, by the computer, whether a similarity score between a respective one of the third skill vectors and a respective one of the skill category vectors is less than a second predetermined threshold; and in response to determining that the similarity score is less than the second predetermined threshold, identify, by the computer, the respective one of the third skill vectors and the respective one of the skill category vectors as adjacent.

11. The computer program product of claim 7, wherein the features extracted from the first similarity scores and the second similarity scores include at least one of: the first similarity scores and the second similarity scores, Boolean variables for whether there are any shared skill category vectors occurring in top skill category vectors, a number of shared top skill category vectors, and similarity scores of the top skill category vectors.

12. The computer program product of claim 7, wherein the industry knowledge base serves as a reference corpus and the collection of the job requisitions serves as a target corpus.

13. A computer system for training a machine learning model used for determining skill adjacencies, the computer system comprising:
 one or more processors, one or more computer readable tangible storage devices, and program instructions stored on at least one of the one or more computer readable tangible storage devices for execution by at least one of the one or more processors, the program instructions executable to:
 generate, by a computer, first imputed word vectors from a first matrix for words in an industry knowledge base but not in a collection of job requisitions;
 add, by the computer, the first imputed word vectors to a reference corpus word embedding model;
 generate, by the computer, second imputed word vectors from a second matrix for words in the collection of the job requisitions but not in the industry knowledge base;
 add, by the computer, the second imputed word vectors to a target corpus word embedding model;
 calculate, by the computer, first similarity scores between first skill vectors obtained from one or more training datasets and second similarity scores between the first skill vectors and skill category vectors pre-calculated from the job requisitions, using both the reference corpus word embedding model and the target corpus word embedding model;
 generate, by the computer, features extracted from the first similarity scores and the second similarity scores;
 train, by the computer, a machine learning model for classifying combinations of skills as adjacent and non-adjacent, using the features as input; and
 wherein the machine learning model is used to determine skill adjacencies between skills extracted from the job requisitions and skills extracted from resumes.

14. The computer system of claim 13, for using the machine learning model to determine skill adjacencies, further comprising the program instructions executable to:
 calculate, by the computer, third similarity scores between second skill vectors for the skills extracted from the job requisitions and third skill vectors for the skills extracted from the resumes, calculate fourth similarity scores which include similarity scores between the second skill vectors and the skill category vectors and include similarity scores between the third skill vectors and the skill category vectors, using both the reference corpus word embedding model and the target corpus word embedding model;
 generate, by the computer, features extracted from the third similarity scores and the fourth similarity scores;
 determine, by the computer, the skill adjacencies between the skills extracted from the job requisitions and the skills extracted from resumes, by using the machine learning model, based on the features extracted from the third similarity scores and the fourth similarity scores; and
 wherein the features extracted from the third similarity scores and the fourth similarity scores include at least one of: the third similarity scores and the fourth similarity scores, Boolean variables for whether there are any shared skill category vectors occurring in top skill category vectors, a number of shared top skill category vectors, and similarity scores of the top skill category vectors.

15. The computer system of claim 14, further comprising the program instructions executable to:
 determine, by the computer, whether a similarity score between a respective one of the second skill vectors and a respective one of the third skill vectors is less than a first predetermined threshold; and
 in response to determining that the similarity score is less than the first predetermined threshold, identify, by the computer, the respective one of the second skill vectors and the respective one of the third skill vectors as adjacent.

16. The computer system of claim 14, further comprising the program instructions executable to:
 determine, by the computer, whether a similarity score between a respective one of the third skill vectors and a respective one of the skill category vectors is less than a second predetermined threshold; and
 in response to determining that the similarity score is less than the second predetermined threshold, identify, by the computer, the respective one of the third skill vectors and the respective one of the skill category vectors as adjacent.

17. The computer system of claim 13, wherein the features extracted from the first similarity scores and the second similarity scores include at least one of: the first similarity scores and the second similarity scores, Boolean variables for whether there are any shared skill category vectors occurring in top skill category vectors, a number of shared top skill category vectors, and similarity scores of the top skill category vectors.

18. The computer system of claim 13, wherein the industry knowledge base serves as a reference corpus and the collection of the job requisitions serves as a target corpus.

* * * * *